(12) United States Patent
Zhang et al.

(10) Patent No.: US 12,468,893 B2
(45) Date of Patent: Nov. 11, 2025

(54) METHOD AND APPARATUS FOR MATCHING WIRELESS HOTSPOT AND POINT OF INTEREST

(71) Applicant: TENCENT TECHNOLOGY (SHENZHEN) COMPANY LIMITED, Shenzhen (CN)

(72) Inventors: Changwang Zhang, Shenzhen (CN); Jihong Zhang, Shenzhen (CN); Saisai Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 416 days.

(21) Appl. No.: 17/575,126

(22) Filed: Jan. 13, 2022

(65) Prior Publication Data
US 2022/0138429 A1 May 5, 2022

Related U.S. Application Data

(63) Continuation of application No. PCT/CN2020/126619, filed on Nov. 5, 2020.

(30) Foreign Application Priority Data
Jan. 20, 2020 (CN) .......................... 202010067531.8

(51) Int. Cl.
G06F 40/30 (2020.01)
G06F 40/166 (2020.01)
G06F 40/279 (2020.01)

(52) U.S. Cl.
CPC ............ G06F 40/30 (2020.01); G06F 40/166 (2020.01); G06F 40/279 (2020.01)

(58) Field of Classification Search
CPC ....... G06F 40/166; G06F 40/279; G06F 40/30
See application file for complete search history.

(56) References Cited

U.S. PATENT DOCUMENTS

2011/0013569 A1 * 1/2011 Scherzer ............... H04W 48/20
707/769
2013/0260797 A1 * 10/2013 Jones ...................... H04W 4/02
455/456.3
(Continued)

FOREIGN PATENT DOCUMENTS

CN 101963961 2/2011
CN 105354226 2/2016
(Continued)

OTHER PUBLICATIONS

Office Action for corresponding application No. CN 202010067531.8 dated Dec. 8, 2022, 9 pages, in Chinese language.
(Continued)

*Primary Examiner* — Thomas H Maung
(74) *Attorney, Agent, or Firm* — Banner & Witcoff, Ltd.

(57) ABSTRACT

This disclosure relates to a method for matching a wireless hotspot and a point of interest. The method may include performing semantic normalization preprocessing on a wireless hotspot name and a point of interest name respectively. The method may further include determining a first similarity between the preprocessed wireless hotspot name and the preprocessed point of interest name according to a matching result of consecutive common strings of the preprocessed wireless hotspot name and the preprocessed point of interest name. The method may further include determining a second similarity between the preprocessed wireless hotspot name and the preprocessed point of interest name according to a length difference between lengths of the preprocessed wireless hotspot name and the preprocessed point of interest name. The method may further include determining a matching result of the wireless hotspot and the point of interest according to the first similarity or the second similarity.

20 Claims, 3 Drawing Sheets

(56) References Cited

U.S. PATENT DOCUMENTS

| | | | |
|---|---|---|---|
| 2015/0248436 A1* | 9/2015 | Podemsky | H04L 67/54 707/724 |
| 2016/0037298 A1 | 2/2016 | Park et al. | |
| 2017/0124181 A1* | 5/2017 | Nauze | G06F 16/3331 |
| 2018/0041867 A1 | 2/2018 | Wang et al. | |

FOREIGN PATENT DOCUMENTS

| | | |
|---|---|---|
| CN | 107832325 | 3/2018 |
| CN | 108287843 A | 7/2018 |
| CN | 108363698 A | 8/2018 |
| CN | 108712712 | 10/2018 |
| CN | 109145219 A | 1/2019 |
| CN | 109672980 A | 4/2019 |
| CN | 109977287 | 7/2019 |
| CN | 110334349 A | 10/2019 |
| CN | 110457706 A | 11/2019 |
| CN | 110706807 A | 1/2020 |
| CN | 111309834 | 6/2020 |

OTHER PUBLICATIONS

English translation of International Search Report issued Feb. 4, 2021 in International Application No. PCT/CN2020/126619.

* cited by examiner

METHOD AND APPARATUS FOR MATCHING WIRELESS HOTSPOT AND POINT OF INTEREST

RELATED APPLICATION

This application is a continuation application of PCT Patent Application No. PCT/CN2020/126619, filed on Nov. 5, 2020, which claims priority to Chinese Patent Application No. 202010067531.8, entitled "METHOD AND APPARATUS FOR MATCHING WIRELESS HOTSPOT AND POINT OF INTEREST" filed on Jan. 20, 2020, wherein the content of each of the above-referenced applications is incorporated herein by reference in its entirety.

FIELD OF THE TECHNOLOGY

This application relates to the field of computer technologies, and in particular, to a method and an apparatus for matching a wireless hotspot and a point of interest.

BACKGROUND OF THE DISCLOSURE

A matching relationship between a wireless hotspot, such as a WI-FI, and a point of interest (POI) is a very important basic knowledge of geographic data mining, and may be used, for example, for mining and application of data related to geographic locations, such as a relationship between POIs and a behavior of a user accessing a POI.

In the related art, solutions for mining a matching relationship between a WI-FI and a POI are roughly classified into two categories, one is a supervised learning algorithm based on training sample learning, and the other is an unsupervised learning algorithm. However, in the two solutions in the related art, the supervised learning algorithm requires a lot of manpower and time for labeling training data. The unsupervised learning algorithm mainly relies on network search services. Due to the relying on the network search services, there are problems such as inability of achieving fast batch matching calculation on massive data and a low matching accuracy, and therefore, real business requirements cannot be well met.

SUMMARY

According to various embodiments provided in this disclosure, a method and an apparatus for matching a wireless hotspot and a point of interest are provided.

A method for matching a wireless hotspot and a point of interest is provided in an embodiment of this disclosure. The method may include acquiring, with a processor circuitry, a wireless hotspot name of a wireless hotspot and a point of interest name of a point of interest and performing, with the processor circuitry, semantic normalization preprocessing on the wireless hotspot name and the point of interest name respectively. The method may further include determining, with the processor circuitry, a first similarity between the preprocessed wireless hotspot name and the preprocessed point of interest name according to a matching result of consecutive common strings of the preprocessed wireless hotspot name and the preprocessed point of interest name. The method may further include determining, with the processor circuitry, a second similarity between the preprocessed wireless hotspot name and the preprocessed point of interest name according to a length difference between lengths of the preprocessed wireless hotspot name and the preprocessed point of interest name. The method may further include determining, with the circuitry processor, a matching result of the wireless hotspot and the point of interest according to the first similarity or the second similarity.

An apparatus for matching a wireless hotspot and a point of interest is provided in another embodiment of this disclosure. The apparatus may include a memory operable to store computer-readable instructions and a processor circuitry operable to read the computer-readable instructions. When executing the computer-readable instructions, the processor circuitry may be configured to acquire a wireless hotspot name of a wireless hotspot and a point of interest name of a point of interest and perform semantic normalization preprocessing on the wireless hotspot name and the point of interest name respectively. The processor circuitry may be further configured to determine a first similarity between the preprocessed wireless hotspot name and the preprocessed point of interest name according to a matching result of consecutive common strings of the preprocessed wireless hotspot name and the preprocessed point of interest name. The processor circuitry may be further configured to determine a second similarity between the preprocessed wireless hotspot name and the preprocessed point of interest name according to a length difference between lengths of the preprocessed wireless hotspot name and the preprocessed point of interest name. The processor circuitry may be further configured to determine a matching result of the wireless hotspot and the point of interest according to the first similarity or the second similarity.

A non-transitory machine-readable media having instructions stored thereon is provided in another embodiment of this disclosure. The instructions may be configured to, when executed, cause a machine to acquire a wireless hotspot name of a wireless hotspot and a point of interest name of a point of interest and perform semantic normalization preprocessing on the wireless hotspot name and the point of interest name respectively. The instructions may be further configured to cause the machine to determine a first similarity between the preprocessed wireless hotspot name and the preprocessed point of interest name according to a matching result of consecutive common strings of the preprocessed wireless hotspot name and the preprocessed point of interest name. The instructions may be further configured to cause the machine to determine a second similarity between the preprocessed wireless hotspot name and the preprocessed point of interest name according to a length difference between lengths of the preprocessed wireless hotspot name and the preprocessed point of interest name. The instructions may be further configured to cause the machine to determine a matching result of the wireless hotspot and the point of interest according to the first similarity or the second similarity.

Details of one or more embodiments of this disclosure are provided in the subsequent accompanying drawings and descriptions. Other features, objectives, and advantages of this disclosure are illustrated in the specification, the accompanying drawings, and the claims.

BRIEF DESCRIPTION OF THE DRAWINGS

To describe the technical solutions in the embodiments of this disclosure more clearly, the following briefly describes accompanying drawings required for describing the embodiments. Apparently, the accompanying drawings in the following description show merely some embodiments of this disclosure, and a person skilled in the art may still derive other accompanying drawings from these accompanying drawings without creative efforts.

DESCRIPTION OF EMBODIMENTS

Figure 1:
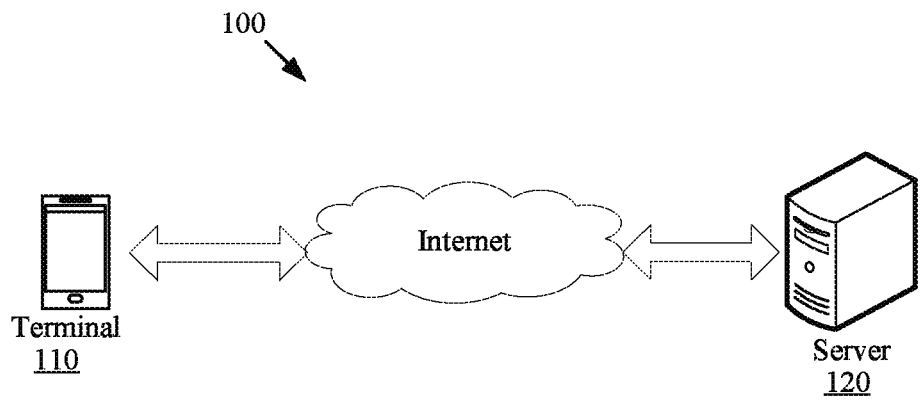
FIG. 1 illustrates an application architecture of a method for matching a wireless hotspot and a point of interest according to an embodiment of this disclosure.

The following clearly and completely describes the technical solutions in embodiments of this disclosure with reference to the accompanying drawings in the embodiments of this disclosure. Apparently, the described embodiments are some of the embodiments of this disclosure rather than all of the embodiments. All other embodiments obtained by a person of ordinary skill in the art based on the embodiments of this disclosure without creative efforts shall fall within the protection scope of this disclosure.

To facilitate the understanding of the embodiments of this disclosure, the following concepts are briefly introduced.

Point of interest (POI): In a geographic information system, a POI may be a house, a shopping center, a store, a post box, a bus station, a community, and the like.

Wireless hotspot: It mainly refers to Wireless-Fidelity (Wi-Fi) in the embodiments of this disclosure, and of course, it may also be another hotspot such as Bluetooth, which is not limited in the embodiments of this disclosure.

String editing distance: It refers to the minimum number of character editing operations (for example, including adding, reducing, position moving, and the like) required to convert one string to another string, and a smaller number indicates a greater similarity between the two strings.

Supervised Learning Algorithm: It represents a machine learning algorithm that learns a mapping model between input and output of the entire data based on input and output of a known part of sample data (i.e., training samples).

Unsupervised Learning Algorithm: It represents a machine learning algorithm that learns a mapping model between input and output of the entire data based on only knowing input of data and not knowing output of any data.

A matching relationship between a wireless hotspot, such as WI-FI, and a POI is a very important basic knowledge of geographic data mining, and can be used for mining and application of numerous important data related to geographic locations, such as a relationship between POIs and a behavior of a user accessing a POI. Therefore, it is very necessary to determine whether the WI-FI matches the POI. In the related art, methods for matching WI-FI and a POI is roughly classified into two categories, namely, the supervised learning algorithm and the unsupervised learning algorithm. The main process of the supervised learning algorithm is: First manually labeling some accurate matching relationship between the WI-FI and points of interest to form training data, then training a machine learning matching model based on the labeled data, and applying the machine learning matching model to more data to mine more matching relationships between the WI-FI and points of interest. The unsupervised learning algorithm mainly includes a method of finding match between a WI-FI name and a point of interest name based on a conventional calculation of a string editing distance and a method of finding match between a WI-FI name and a point of interest name based on a network search result.

However, these methods in the related art have the following problems: 1) The supervised learning algorithm requires manually labeling accurate matching relationships between WI-FI and POIs to form training data. However, the current supervised learning algorithm is increasingly complex and require increasingly more training data. A supervised learning algorithm that can actually be used often requires millions or even tens of millions of pieces of manually labeled training data, and labeling of the training data requires consuming a lot of manpower and time, which reduces the efficiency, 2) In the supervised learning algorithm, a main problem of the method of finding match between the WI-FI name and the point of interest name based on the calculation of the string editing distance is the lack of targeted optimization for a scenario of matching the WI-FI and the point of interest. The matching degree of characters rather than semantics is calculated, resulting in a low matching accuracy. For example, an editing distance between WI-FI "abc" and a point of interest "abc Limited Liability Company" is 6, which is very high and will be determined by the editing distance-based method as that there is no match, but in fact there is a matching relationship between the two, 3) In the unsupervised learning algorithm, a main problem of the method of finding match between the WI-FI name and the point of interesting name based on a network search result is the relying on a network search service, so that batch fast matching calculation of massive data cannot be realized. Moreover, the network search service is general, it optimizes the search scenario, and there is no targeted optimization for a required scenario of matching the WI-FI and the POI, resulting in a low accuracy of a matching result. As can be seen, the efficiency and accuracy of the methods for matching the WI-FI with the point of interesting are low in the current related art, and cannot meet requirements of real business scenarios.

Therefore, in response to the above problems, a method for matching a wireless hotspot and a point of interest is provided in an embodiment of this disclosure, which does not require model training, and includes acquiring a wireless hotspot name of a wireless hotspot and a point of interest name of a point of interest; performing semantic normalization preprocessing on the wireless hotspot name and the point of interest name respectively to determine a first similarity and a second similarity between the preprocessed wireless hotspot name and the preprocessed point of interest name after the semantic normalization processing; and determining a matching result of the wireless hotspot and the point of interest according to at least one of the first similarity and the second similarity. In this way, automatic matching of a wireless hotspot and a point of interest is implemented by performing semantic normalization on the wireless hotspot name and the point of interest name and calculating the similarity between names; therefore, it does not require manual labeling of training data, and it is targeted to a scenario of matching a wireless hotspot and a point of interest, thus improving the efficiency and accuracy.

Referring to FIG. 1, a schematic diagram of an application architecture 100 of a method for matching a wireless hotspot and a point of interest according to an embodiment of this disclosure is shown, including a terminal 110 and a server 120.

The terminal 110 may be any smart device such as a smart phone, a tablet computer, or a portable personal computer. The terminal 110 has a network function and can search for and connect to an available wireless hotspot, such as WI-FI.

The server 120 can provide various network services for the terminal 110, and the server 120 may acquire related information of the wireless hotspot from the terminal 110, and then may perform semantic normalization preprocessing on a wireless hotspot name and a point of interest name with reference to a POI database and based on the method for matching a wireless hotspot a point of interest in the embodiment of this disclosure, determine a first similarity and a second similarity between the preprocessed wireless hotspot name and the preprocessed point of interest name, thus mining a matching relationship between the wireless hotspot and the POI according to at least one of the first similarity and the second similarity.

Furthermore, the server 120 may perform another business application based on the matching relationship between the wireless hotspot and the POI. For example, according to the WI-FI connected to the terminal 110 of a user and the matching relationship between the WI-FI and the POI, the server may analyze information such as behaviors of the user and visited POI places. In another example, the server may also analyze a relationship between POIs according to the matching relationship between the wireless hotspot and the POI, which is not limited in the embodiment of this disclosure.

The server 120 may be one server, a server cluster including several servers, or a cloud computing center.

The terminal 110 and the server 120 may be connected through the Internet, to communicate with each other. A standard communication technology and/or protocol may be used for the internetwork described above. The internetwork is usually the Internet, but may alternatively be any other network, including but not limited to, a local area network (LAN), a metropolitan area network (MAN), a wide area network (WAN), or any combination of a mobile, wired, or wireless network, a dedicated network, or a virtual dedicated network. In some embodiments, technologies and/or formats such as the HyperText Markup Language (HTML) and the extensible markup language (XML) are used for representing data exchanged through the network. In addition, all or some links may be encrypted by using conventional encryption technologies such as a secure socket layer (SSL), transport layer security (TLS), a virtual private network (VPN), and internet protocol security (IPsec). In some other embodiments, custom and/or dedicated data communication technologies may also be used in place of or in addition to the foregoing data communication technologies.

The application architecture diagram in the embodiment of the present disclosure is to illustrate the technical solution in the embodiment of the present disclosure more clearly, and does not constitute a limitation to the technical solution provided in the embodiment of the present disclosure, and is not limited to an application of matching WI-FI and a POI. For other application architectures and applications, the technical solution provided by the embodiment of the present disclosure is equally applicable to similar problems.

Figure 2:
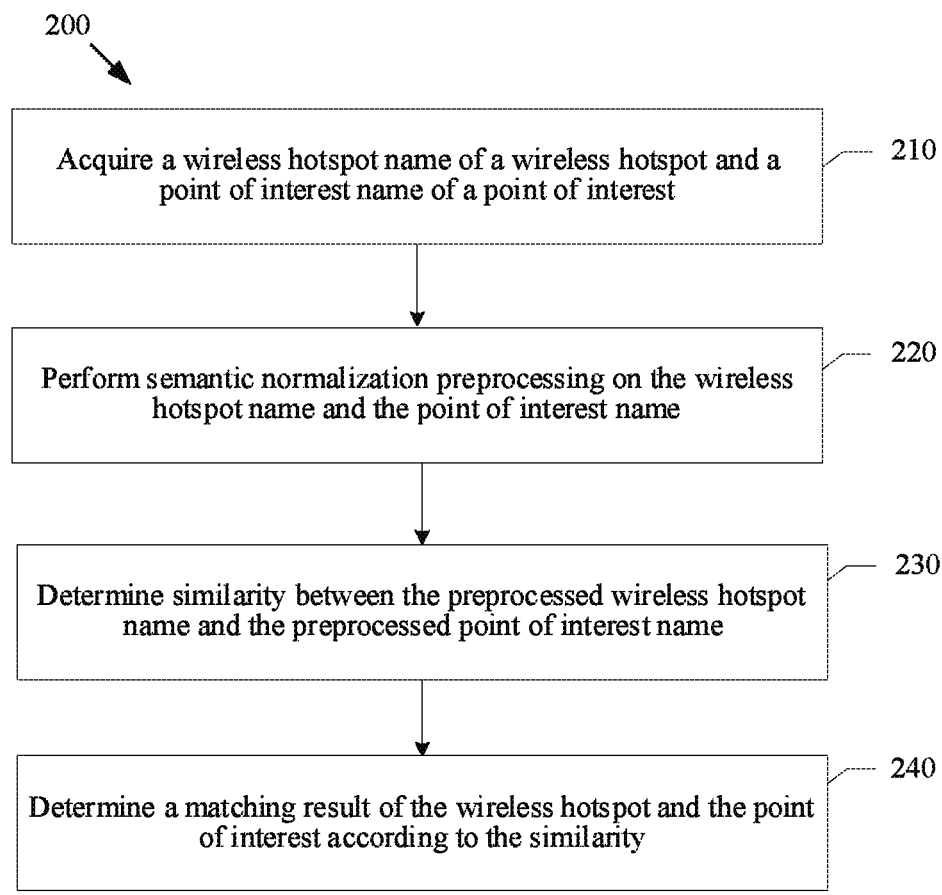
FIG. 2 is a flowchart of a method for matching a wireless hotspot and a point of interest according to an embodiment of this disclosure.

In an embodiment, as shown in FIG. 2, a method 200 for matching a wireless hotspot and a point of interest is provided. In this embodiment, the method applied to a server is illustrated as an example. It is understandable that the method may also be applied to a terminal, or applied to a system including a terminal and a server and implemented through interaction of the terminal and the server. In this embodiment, the method includes the following steps.

Step 210: Acquire a wireless hotspot name of a wireless hotspot and a point of interest name of a point of interest.

In the embodiment of this disclosure, a large number of wireless hotspot names and point of interest names may be acquired, and then matched separately, thus mining a matching relationship between a wireless hotspot and a point of interest. Alternatively, a wireless hotspot name on the terminal may be acquired, and a POI near a location of the wireless hotspot may be determined, or a nearby wireless hotspot may be determined based on a POI location, and then a matching relationship between the wireless hotspot and the POI is determined. Specific application scenarios are not limited.

Step 220: Perform semantic normalization preprocessing on the wireless hotspot name and the point of interest name respectively.

The semantic normalization preprocessing refers to a preprocessing process based on semantics and includes, for example, data cleaning and synonym normalization, etc., which is not limited in the embodiment of this disclosure.

Specifically, during the performing of step 220, the following implementations may be included:

The first implementation manner: Data cleaning.

It specifically includes: Deleting, based on a preset filter word library, filter words in the wireless hotspot name and the point of interest name respectively, wherein the preset filter word library includes a plurality of filter words, and the filter words represent words that have general meaning but no specific significance.

In the embodiment of this disclosure, a filter word library may be constructed in advance, for example, some filter words may be collected through the network or based on actual experience. For example, filter words may be mined and set by considering characteristics of wireless hotspot names and point of interest names.

For example, filter words such as "public," "guest," and "5g" will be removed from WI-FI names, and filter words such as "limited liability company" will be removed from POI names.

In this way, based on the filter word library, some words without specific significance in the wireless hotspot name and point of interest name may be deleted, thus improving the efficiency of subsequent calculation of a name similarity.

The second implementation: Normalization of synonyms.

It specifically includes: Replacing, based on a preset thesaurus, words having identical meaning in the wireless hotspot name and the point of interesting name with a corresponding general word. The preset thesaurus includes a variety of types of words having identical meaning, and each type of words having identical meaning corresponds to a general word having identical meaning, and the general word may be one designated from each type of words having identical meaning.

In the embodiment of this disclosure, the thesaurus involved in the wireless hotspot name and point of interest name is constructed in advance. A specific construction method may also be collecting through the network or setting according to manual experience. Based on the thesaurus, it may be determined whether words are synonyms, and a corresponding general word may be determined.

In this way, words having identical meaning in the wireless hotspot name and the point of interest name may be replaced with the same word according to the thesaurus. For example, "courier," "express," "express delivery," and the like are synonymous, and they have identical meaning that are all related to express delivery. A general word corresponding to such type of words is "express delivery," and therefore, express delivery-related strings such as "courier" and "express" in the WI-FI name and the POI name may be replaced with the general word "express delivery." Not only whether the characters of the wireless hotspot name and the point of interest name are identical but also the semantic information are taken into consideration, thereby improving the calculation accuracy.

Of course, in the embodiment of this disclosure, the semantic normalization preprocessing may be performed on the wireless hotspot name and the point of interest name only according to the first or second implementation, or the semantic normalization preprocessing may be performed according to the first and second implementations mentioned above. For example, data cleaning may be performed on the wireless hotspot name and the point of interest name to delete filter words, and then synonym replacement may be performed on the wireless hotspot name and the point of interest name after the data cleaning, so that words having identical meaning are replaced with a corresponding general word.

Step 230: Determine a similarity between the wireless hotspot name and point of interest name after the semantic normalization preprocessing.

During the performing of step 230, the following manners may be included:

The first method: Common string similarity.

Specifically, a first similarity between the wireless hotspot name and the point of interest name after the semantic normalization preprocessing is determined according to a matching result of consecutive common strings of the wireless hotspot name and the point of interest name after the semantic normalization preprocessing.

It specifically includes: S1: Match the wireless hotspot name and the point of interest name after the semantic normalization preprocessing to determine a plurality of consecutive common strings.

The consecutive common strings refer to consecutive and identical strings. For example, the Chinese WI-FI name "锦绣中华民俗村" ("Splendid China folk-custom village" in English) and the Chinese POI name "锦绣中华.中国民俗文化村" ("Splendid China. Chinese folk-custom culture village" in English) after the semantic normalization preprocessing are matched to determine a consecutive common string set {"锦绣中华", "民俗", "村"} ({"Splendid China". "folk-custom," "village"} in English).

Specifically, all consecutive common strings of the wireless hotspot name and the point of interest name are calculated to obtain consecutive common strings of a consecutive common string set S. Consecutive common string S2: Determine similarity scores of the consecutive common strings according to lengths of the consecutive common strings and lengths of the wireless hotspot name and the point of interest name after the semantic normalization preprocessing.

Specifically, S2.1: Determine a minimum value of the lengths of the wireless hotspot name and the point of interest name after the semantic normalization preprocessing.

That is, the lengths of the wireless hotspot name and the point of interest name after the semantic normalization preprocessing are determined separately, and a minimum value is selected. For example, the Chinese WI-FI name is "锦绣中华民俗村" ("Splendid China folk-custom village" in English) and the Chinese POI name is "锦绣中华.中国民俗文化村" ("Splendid China Chinese folk-custom culture village," in English) that is, the length of the WI-FI name is 7, the length of the POI name is 12, and a minimum value of the two is 7. The following descriptions use lengths as determined from the WI-FI and POI name in Chinese.

S2.2: Determine ratios of the lengths of the consecutive common strings to the minimum value, respectively.

For example, the consecutive common string set is S, each consecutive common string in S is Si, and a ratio of the length of each consecutive common string Si to the minimum value is Ei, then:

$$Ei = \text{the length of } Si/(\text{the minimum value of the lengths of the wireless hotspot name and the point of interest name after the semantic normalization preprocessing}).$$

S2.3: Determine, according to the ratios, the similarity scores of the corresponding consecutive common strings respectively.

It is understandable that when a certain ratio Ei is determined by the length of a certain consecutive common string Si, the ratio Ei corresponds to the consecutive common string Si.

For example, a similarity score of each consecutive common string Si in S is Di, and then Di=Ei*f(Ei).

In the formula, f(x) may be any function that maps x from 0-1 to 0-1, for example, f(x)=2*x/(x+1), which is not limited in the embodiment of this disclosure.

In this way, the purpose of the f(x) function is to non-linearly map the ratio and improve the accuracy of similarity calculation.

For example, the length of "Splendid China" is 4, and a ratio of the length to the minimum value 7 is E1=4/7, the length of "folk-custom" is 2, and a ratio of the length to the minimum value is E2=2/7, and the length of "village" is 1, and a ratio of the length to the minimum value is E3=1/7, then D1=(4/7)*f(4/7), D2=(2/7)*f(2/7), and D3=(1/7)*f(1/7).

S3: Determine, according to the similarity scores of the consecutive common strings, a first similarity between the wireless hotspot name and the point of interest name after the semantic normalization preprocessing.

Specifically, the similarity scores of the consecutive common strings are added, and a sum of the addition is regarded as the first similarity.

For example, the first similarity=$\Sigma_i Di$.

For example, taking f(x)=2*x/(x+1) as an example, the first similarity of the WI-FI name "Splendid China folk-custom village" and the POI name "Splendid China• Chinese folk-custom culture village"=D1+D2+D3=(4/7)*f(4/7)+(2/7)*f(2/7)+(1/7)*f(1/7)=0.578.

The second manner: Length similarity.

Specifically, a second similarity between the wireless hotspot name and the point of interest name after the semantic normalization preprocessing is determined according to a length difference between lengths of the wireless hotspot name and the point of interest name after the semantic normalization preprocessing.

It specifically includes: R1: Determine a length difference between lengths of the wireless hotspot name and the point of interest name after the semantic normalization preprocessing.

For example, a length difference between the WI-FI name and the POI name after the semantic normalization preprocessing is A, and still by taking the WI-FI name "Splendid China folk-custom village" and the POI name "Splendid China• Chinese folk-custom culture village" as an example, the length difference is 5.

R2: Determine a second similarity between the wireless hotspot name and the point of interest name after the semantic normalization preprocessing according to the length difference and the lengths of the wireless hotspot name and the point of interest name after the semantic normalization preprocessing.

Specifically, R2.1: Determine a maximum value of the lengths of the wireless hotspot name and the point of interest name after the semantic normalization preprocessing.

For example, the WI-FI name is "Splendid China folk-custom village" and the POI name is "Splendid China• Chinese folk-custom culture village", and a maximum value of the name lengths is 12.

R2.2: Determine a ratio of the length difference to the maximum value, obtain a difference by subtracting the ratio from 1, and regard the difference as the second similarity between the wireless hotspot name and the point of interest name after the semantic normalization preprocessing.

For example, the length difference is A, and the second similarity=1−A/(the maximum value of the lengths of the wireless hotspot name and the point of interest name).

For example, the length difference between the WI-FI name "Splendid China folk-custom village" and the POI name "Splendid China• Chinese folk-custom culture village" is 5, the maximum value is 12, and the second similarity=1−5/12=0.583.

The third manner: A comprehensive similarity of the common string similarity and the length similarity.

It specifically includes: Determine, according to the first similarity and the second similarity, a third similarity between the wireless hotspot name and the point of interest name after the semantic normalization preprocessing.

Specifically, Q1: Determine a first product of the first similarity and a first weight value and a second product of the second similarity and a second weight value, respectively, wherein a sum of the first weight value and the second weight value is 1.

Q2: Determine a sum of the first product and second product as the third similarity between the wireless hotspot name and the point of interest name after the semantic normalization preprocessing.

For example, the third similarity=the first similarity*a+the second similarity*b, where a and b are two coefficients with values between 0 and 1, a is the first weight value, b is the second weight value, and they meet a+b=1.

For example, based on the above example, the first similarity is 0.578, the second similarity is 0.583, and taking a=0.9 and b=0.1 as an example, the third similarity of the WI-FI name "Splendid China folk-custom village" and the POI name "Splendid China Chinese• folk-custom culture village" is: 0.578*0.9+0.583*0.1=0.578.

Of course, a or b may take a value of 0. In this case, the third similarity is actually equal to the first similarity or the second similarity, which is not limited in the embodiment of this disclosure.

In the embodiment of this disclosure, after the semantic normalization preprocessing such as data cleaning and synonym replacement, the common string similarity or the length similarity between the wireless hotspot name and the point of interest name, or the comprehensive similarity between the two may be calculated. No model training is required, the calculation is simpler, and the efficiency and accuracy are improved.

Step 240: Determine a matching result of the wireless hotspot and the point of interesting according to at least one of the first similarity and the second similarity.

During the performing of step 240, according to different similarities, the step may be classified into the following manners correspondingly:

The first manner: When the first similarity is not less than a first preset threshold, determine that the wireless hotspot matches the point of interest, and when the first similarity is less than the first preset threshold, determine that the wireless hotspot does not match the point of interest.

The second manner: When the second similarity is not less than a second preset threshold, determine that the wireless hotspot matches the point of interest, and when the second similarity is less than the second preset threshold, determine that the wireless hotspot does not match the point of interest.

The third manner: Determine the matching result of the wireless hotspot and the point of interest according to the first similarity and the second similarity, including determining the matching result of the wireless hotspot and the point of interest according to the third similarity.

Specifically, when the third similarity is not less than a third preset threshold, it is determined that the wireless hotspot matches the point of interest; and if the third similarity is less than the third preset threshold, it is determined that the wireless hotspot does not match the point of interest.

Each preset threshold may be set according to actual conditions and experience, which is not limited in the embodiment of this disclosure.

In other words, in the embodiment of this disclosure, there are many manners of calculating the similarity, for example, the first similarity, the second similarity, and the third similarity in the above embodiment, and thereby determining whether the wireless hotspot matches the point of interest according to the similarity may be performed by comparing the first similarity, the second similarity, or the third similarity with the threshold, thus determining whether the wireless hotspot matches the point of interest.

In the embodiment of this disclosure, to determine whether a wireless hotspot matches a point of interest, a wireless hotspot name of the wireless hotspot and a point of interest name of the point of interest are acquired, semantic normalization preprocessing is performed first, a first similarity and a second similarity between the wireless hotspot name and the point of interest name after the semantic normalization preprocessing are determined, and a matching result of the wireless hotspot and the point of interest is determined according to at least one of the first similarity and the second similarity. In this way, the solution in the embodiment of this disclosure does not require model training, and does not require manual labeling of training data, which reduces costs and does not rely on network search services. A scenario of matching a wireless hotspot and a point of interest is taken into consideration, and a targeted algorithm optimization and targeted semantic normalization preprocessing are performed to determine whether the wireless hotspot matches the point of interest, thereby implementing automatic matching of the wireless hotspot and the point of interest and improving the accuracy. Moreover, the calculation method is simpler and the efficiency is improved.

Figure 3:
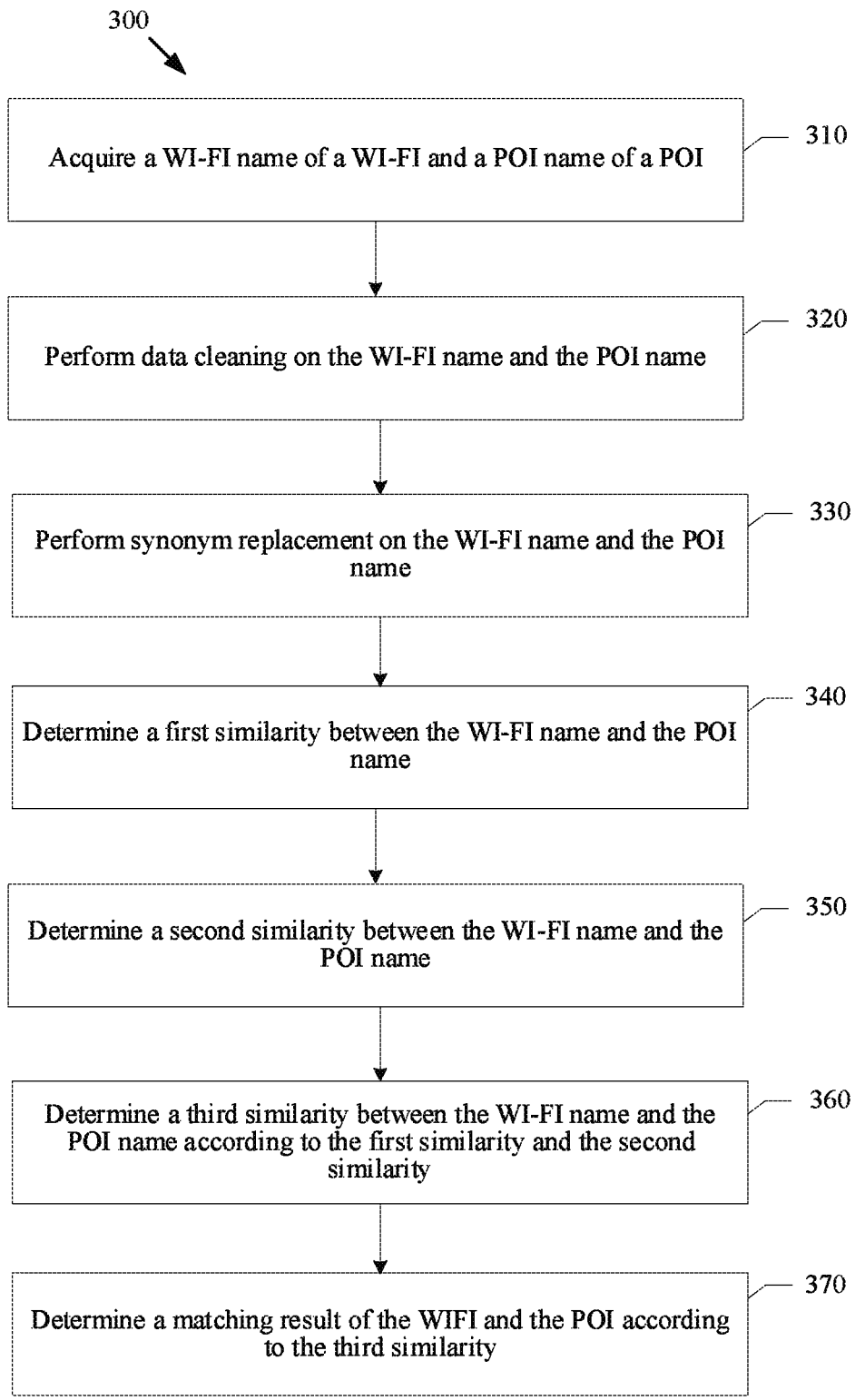
FIG. 3 is a flowchart of a method for matching a wireless hotspot and a point of interest according to another embodiment of this disclosure.

Based on the above embodiment, illustration is made below by using a specific application scenario to calculate a comprehensive similarity of the common string similarity and the length similarity, and the wireless hotspot being WI-FI is taken as an example. Referring to FIG. 3, a flowchart of a method 300 for matching a wireless hotspot and a point of interest according to another embodiment of this disclosure is provided, and the method includes the following steps.

Step 310: Acquire a WI-FI name of a WI-FI and a POI name of a POI.

Step 320: Perform data cleaning on the WI-FI name and the POI name.

Specifically, based on a preset filter word library, filter words in the WI-FI name and the POI name are deleted respectively.

Step 330: Perform synonym replacement on the WI-FI name and the POI name.

Specifically, based on a preset thesaurus, words having identical meaning in the WI-FI name and the POI name are replaced with a corresponding general word.

Step 340: Determine a first similarity between the WI-FI name and the POI name.

Specifically, the WI-FI name and the POI name after the semantic normalization preprocessing are matched to determine a plurality of consecutive common strings, similarity scores of the consecutive common strings are determined respectively, and the first similarity between the WI-FI name and the POI name after the semantic normalization preprocessing is determine according to the similarity scores of the consecutive common strings.

Step 350: Determine a second similarity between the WI-FI name and the POI name.

Specifically, a length difference between the lengths of the WI-FI name and the POI name after the semantic normalization preprocessing is determined. The second similarity between the WI-FI name and the POI name after the semantic normalization preprocessing is determined according to the length difference and the lengths of the WI-FI name and the POI name after the semantic normalization preprocessing.

Step 360: Determine a third similarity between the WI-FI name and the POI name according to the first similarity and the second similarity.

Step 370: Determine a matching result of the WIFI and the POI according to the third similarity.

For example, when the third similarity is not less than the preset threshold, it is determined that the WI-FI matches the POI. When the third similarity is less than the preset threshold, it is determined that the WI-FI does not match the POI.

In this way, in the embodiment of this disclosure, filter word deletion and synonym replacement are performed on the WI-FI name and the POI name, and semantic normalization preprocessing may be performed on the WI-FI name and the POI name, which reduces the amount of calculation for subsequent similarity calculation. Moreover, because some meaningless filter words are removed, and words having identical meaning are replaced uniformly not only for characters but for consideration of semantics, the accuracy of the similarity calculation is thus improved. During calculation of the similarity, the common string similarity and the length similarity may be calculated to obtain a comprehensive similarity of the two, and whether the WI-FI matches the POI may be determined by combining the two, which also increases the matching accuracy.

Based on the above embodiment, the method for matching a wireless hotspot and a point of interest in the embodiment of this disclosure is further illustrated by specifically describing an example of a WI-FI and a POI, which may be specifically divided into the following parts.

First part: Acquire a WI-FI name of a WI-FI and a POI name of a POI, and perform semantic normalization preprocessing.

For example, after the semantic normalization preprocessing, the WI-FI name is "Splendid China folk-custom village," and POI names are "Splendid China• Chinese folk-custom culture village," "Splendid China-folk house of Bai nationality," and "Chinese folk-custom culture village."

Second part: Calculate a first similarity.

First similarity=$\Sigma_i Di$.

Si is consecutive common strings in the WI-FI name and the POI name, $Di=Ei*f(Ei)$, $Ei$=the length of $Si$/(a minimum value of lengths the WI-FI name and the POI name after the semantic normalization preprocessing), and $f(x)=2*x/(x+1)$.

Then, first similarities between the WI-FI name "Splendid China folk-custom village" and the POI names "Splendid China• Chinese folk-custom culture village," "Splendid China-folk house of Bai nationality," and "Chinese folk-custom culture village" are calculated through the calculation formula of the first similarity. Calculation results are shown in Table 1. Table 1 is an example of calculation of the first similarity between the WI-FI name and the POI name according to the embodiment of this disclosure.

TABLE 1

| WI-FI name | POI name | Consecutive common string set | First similarity |
|---|---|---|---|
| Splendid China folk-custom village | Splendid China• Chinese folk-custom culture village | {Splendid China, folk-custom, village} | 0.578 |
| Splendid China folk-custom village | Splendid China-folk house of Bai nationality | {Splendid China, folk} | 0.451 |
| Splendid China folk-custom village | Chinese folk-custom culture village | {China, folk-custom, village} | 0.198 |

As shown in Table 1, the consecutive common string set S of the WI-FI name "Splendid China folk-custom village" and the POI name "Splendid China• Chinese folk-custom culture village" is {Splendid China, folk-custom, village}. The length of the WI-FI name is 7, the length of the POI name is 12, and the first similarity based on the common strings is: $D1+D2+D3=E1*f(E1)+E2*f(E2)+E3*f(E3)=(4/7)*f(4/7)+(2/7)*f(2/7)+(1/7)*f(1/7)=(4/7)*(8/11)+(2/7)*(4/9)+(1/7)*(2/8)=1603/2772=0.578$.

Likewise, the first similarities between "Splendid China folk-custom village" and "Splendid China-folk house of Bai nationality" and between "Splendid China folk-custom village" and "Chinese folk-custom culture village" may be calculated, which are 0.451 and 0.198, respectively.

The third part: Calculate a second similarity.

The second similarity=$1-A$/(the maximum value of the lengths of the WI-FI name and the POI name).

A is a length difference between the WI-FI name and the POI name after the semantic normalization preprocessing.

For example, second similarities between the WI-FI name "Splendid China folk-custom village" and the POI names "Splendid China• Chinese folk-custom culture village," "Splendid China-folk house of Bai nationality," and "Chinese folk-custom culture village" are calculated through the calculation formula of the second similarity. Calculation results are shown in Table 2. Table 2 is an example of calculation of the second similarity between the WI-FI name and the POI name according to the embodiment of this disclosure.

TABLE 2

| WI-FI name | POI name | Second similarity |
|---|---|---|
| Splendid China folk-custom village | Splendid China• Chinese folk-custom culture village | 0.583 |
| Splendid China folk-custom village | Splendid China-folk house of Bai nationality | 0.777 |
| Splendid China folk-custom village | Chinese folk-custom culture village | 1.0 |

As shown in Table 2, the length difference between the WI-FI name "Splendid China folk-custom village" and the POI name "Splendid China• Chinese folk-custom culture village" is 5, the maximum value is 12, and the second similarity between the two is 1−5/12=0.583. Likewise, the length difference between the name "Splendid China folk-custom village" and "Splendid China-folk house of Bai nationality" is (9−7=2), the maximum value is 9, and the second similarity between the two is 1−2/9=0.777. The length difference between "Splendid China folk-custom village" and "Chinese folk-custom culture village" is 0, and the second similarity between the two is 1.

The fourth part: Calculate a third similarity.

The third similarity=the first similarity*$a$+the second similarity*$b$.

For example, by taking a being 0.9 and b being 0.1 as an example, based on the above Table 1 and Table 2, calculation results of third similarities between the WI-FI name "Splendid China folk-custom village" and the POI names "Splendid China. Chinese folk-custom culture village." "Splendid China-folk house of Bai nationality," and "Chinese folk-custom culture village" are shown in Table 3. Table 2 is an example of calculation of the third similarity between the WI-FI name and the POI name according to the embodiment of this disclosure.

TABLE 3

| WI-FI name | POI name | First similarity | Second similarity | Third similarity |
|---|---|---|---|---|
| Splendid China folk-custom village | Splendid China• Chinese folk-custom culture village | 0.578 | 0.583 | 0.578 |
| Splendid China folk-custom village | Splendid China-folk house of Bai nationality | 0.451 | 0.777 | 0.483 |
| Splendid China folk-custom village | Chinese folk-custom culture village | 0.198 | 1.0 | 0.278 |

As shown in Table 3, the third similarity between the WI-FI name "Splendid China folk-custom village" and the POI name "Splendid China• Chinese folk-custom culture village" is 0.9*0.578+0.1*0.583=0.578. The third similarity between "Splendid China folk-custom village" and "Splendid China-folk house of Bai nationality" is 0.9*0.451+0.1*0.777=0.483, and the third similarity between "Splendid China folk-custom village" and "Chinese folk-custom culture village" is 0.9*0.198+0.1*1.0=0.278.

The fifth part: Determine, according to the similarity, whether the WIFI matches the POI.

Specifically. A preset threshold Ta may be used to determine that the WI-FI and the POI with the third similarity not less than Ta match each other; otherwise, it is determined that they do not match each other.

In this way, after the semantic normalization preprocessing is performed on the names of the WI-FI and the POI, the comprehensive similarity, i.e., the third similarity, is obtained by comprehensively considering the first similarity based on the common strings and the second similarity based on the lengths. According to the third similarity, it is determined whether the WI-FI matches the POI. The WI-FI and the POI may be automatically matched, which improves the accuracy. For example, the accuracy of manual sampling is over 85%, and compared with using the conventional matching solution based on editing distances, the accuracy is increased by 20%.

The steps in the embodiments of this disclosure are not necessarily performed according to a sequence indicated by step numbers. Unless otherwise explicitly specified in this disclosure, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

Figure 4:
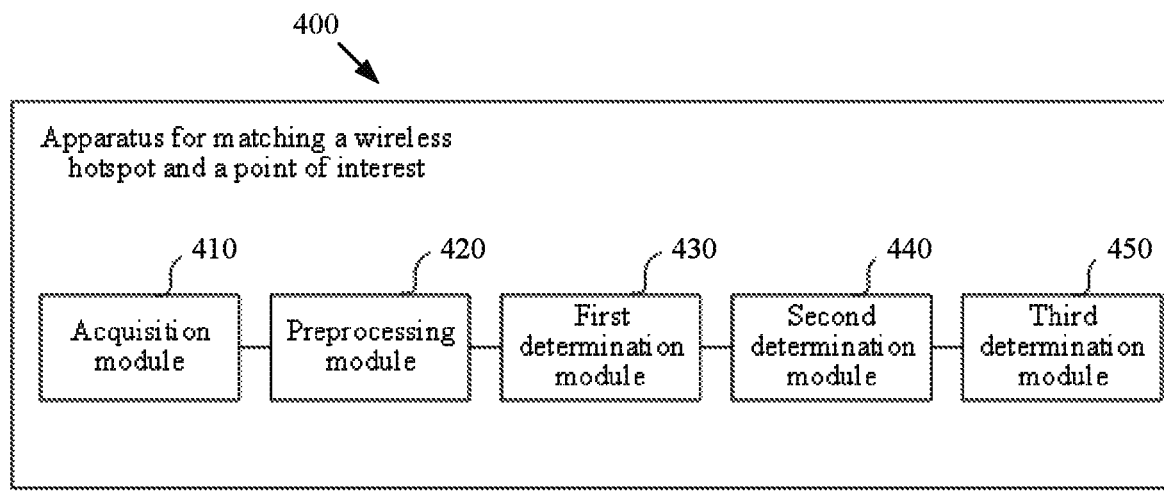
FIG. 4 is a schematic structural diagram of an apparatus for matching a wireless hotspot and a point of interest according to an embodiment of this disclosure.

Based on the same inventive concept, an apparatus for matching a wireless hotspot and a point of interest is further provided in an embodiment of this disclosure. The apparatus for matching a wireless hotspot and a point of interest may be, for example, the server in the foregoing embodiment, and may be a hardware structure, a software module, or a hardware structure plus a software module. Based on the above embodiment, referring to FIG. 4, an apparatus 400 for matching a wireless hotspot and a point of interest according to an embodiment of this disclosure specifically includes the following modules.

An acquisition module 410 is configured to acquire a wireless hotspot name of a wireless hotspot and a point of interest name of a point of interest.

A preprocessing module 420 is configured to perform semantic normalization preprocessing on the wireless hotspot name and the point of interest name respectively.

A first determination module 430 is configured to determine, according to a matching result of consecutive common strings of the wireless hotspot name and the point of interest name after the semantic normalization preprocessing, a first similarity between the wireless hotspot name and the point of interest name after the semantic normalization preprocessing.

A second determination module 440 is configured to determine, according to a length difference between lengths of the wireless hotspot name and the point of interest name after the semantic normalization preprocessing, a second similarity between the wireless hotspot name and the point of interest name after the semantic normalization preprocessing.

A third determination module 450 is configured to determine a matching result of the wireless hotspot and the point of interest according to at least one of the first similarity and the second similarity.

In an implementation, during the performing of the semantic normalization preprocessing on the wireless hotspot name and the point of interest name respectively, the preprocessing module 420 is specifically configured to:

Delete, based on a preset filter word library, filter words in wireless hotspot name and point of interesting name respectively, wherein the preset filter word library includes a plurality of filter words, and the filter words represent words that have general meaning but no specific significance.

In an implementation, during the performing of the semantic normalization preprocessing on the wireless hotspot name and the point of interest name respectively, the preprocessing module 420 is specifically configured to:

Replace, based on a preset thesaurus, words having identical meaning in the wireless hotspot name and the point of interest name with a corresponding general word.

In an implementation, during the determination, according to the matching result of the consecutive common strings of the wireless hotspot name and the point of interest name after the semantic normalization preprocessing, of the first similarity between the wireless hotspot name and the point of interest name after the semantic normalization preprocessing, the first determination module 430 is specifically configured to:

Match the wireless hotspot name and the point of interest name after the semantic normalization preprocessing to determine a plurality of consecutive common strings;

determine similarity scores of the consecutive common strings according to lengths of the consecutive common strings and lengths of the wireless hotspot name and the point of interest name after the semantic normalization preprocessing; and determine, according to the similarity scores of the consecutive common strings, the first similarity between the wireless hotspot name and the point of interest name after the semantic normalization preprocessing.

In an implementation, during the determination of the similarity scores of the consecutive common strings according to the lengths of the consecutive common strings and the lengths of the wireless hotspot name and the point of interest name after the semantic normalization preprocessing, the first determination module 430 is specifically configured to:

Determine a minimum value of the lengths of the wireless hotspot name and the point of interest name after the semantic normalization preprocessing;

determine ratios of the lengths of the consecutive common strings to the minimum value, respectively; and determine, according to the ratios, the similarity scores of the corresponding consecutive common strings respectively.

In an implementation, during the determination, according to the length difference between the lengths of the wireless hotspot name and the point of interest name after the semantic normalization preprocessing, of the second similarity between the wireless hotspot name and the point of interest name after the semantic normalization preprocessing, the second determination module 440 is specifically configured to:

Determine a length difference between the lengths of the wireless hotspot name and the point of interest name after the semantic normalization preprocessing; and determine the second similarity between the wireless hotspot name and the point of interest name after the semantic normalization preprocessing according to the length difference and the lengths of the wireless hotspot name and the point of interest name after the semantic normalization preprocessing.

In an implementation, during the determination of the second similarity between the wireless hotspot name and the point of interest name after the semantic normalization preprocessing, the second determination module 440 is specifically configured to:

Determine a maximum value of the lengths of the wireless hotspot name and the point of interest name after the semantic normalization preprocessing; and determine a ratio of the length difference to the maximum value, obtain a difference by subtracting the ratio from 1, and regard the difference as the second similarity between the wireless hotspot name and the point of interest name after the semantic normalization preprocessing.

In an implementation, during the determination of the matching result of the wireless hotspot and the point of interest according to at least one of the first similarity and the second similarity, the third determination module 450 is specifically configured to:

Determine, according to the first similarity and the second similarity, a third similarity between the wireless hotspot name and point of interest name after the semantic normalization preprocessing; and determine the matching result between the wireless hotspot and the point of interest according to the third similarity.

In an implementation, during the determination, according to the similarities, according to the first similarity and the second similarity, of the third similarity between the wireless hotspot name and the point of interesting name after the semantic normalization preprocessing, the third determination module 450 is specifically configured to:

determine a first product of the first similarity and a first weight value and a second product of the second similarity and a second weight value, respectively, wherein a sum of the first weight value and the second weight value is 1; and determine a sum of the first product and the second product as the third similarity between the wireless hotspot name and the point of interest name after the semantic normalization preprocessing.

In an implementation, during the determination of the matching result of the wireless hotspot and the point of interest according to at least one of the first similarity and the second similarity, the third determination module 450 is specifically configured to:

when the first similarity is not less than a first preset threshold, determine that the wireless hotspot matches the point of interest, and when the first similarity is less than the first preset threshold, determine that the wireless hotspot does not match the point of interest.

In an implementation, during the determination of the matching result of the wireless hotspot and the point of interest according to at least one of the first similarity and the second similarity, the third determination module 450 is specifically configured to:

when the second similarity is not less than a second preset threshold, determine that the wireless hotspot matches the point of interest, and when the second similarity is less than the second preset threshold, determine that the wireless hotspot does not match the point of interest.

In an implementation, during the determination of the matching result of the wireless hotspot and the point of interest according to at least one of the first similarity and the second similarity, the third determination module 450 is specifically configured to:

When the third similarity is not less than a third preset threshold, determine that the wireless hotspot matches the point of interest, and when the third similarity is less than the third preset threshold, determine that the wireless hotspot does not match the point of interest.

The term module (and other similar terms such as unit, submodule, etc.) may refer to a software module, a hardware module, or a combination thereof. A software module (e.g., computer program) may be developed using a computer programming language. A hardware module may be implemented using processor circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Figure 5:
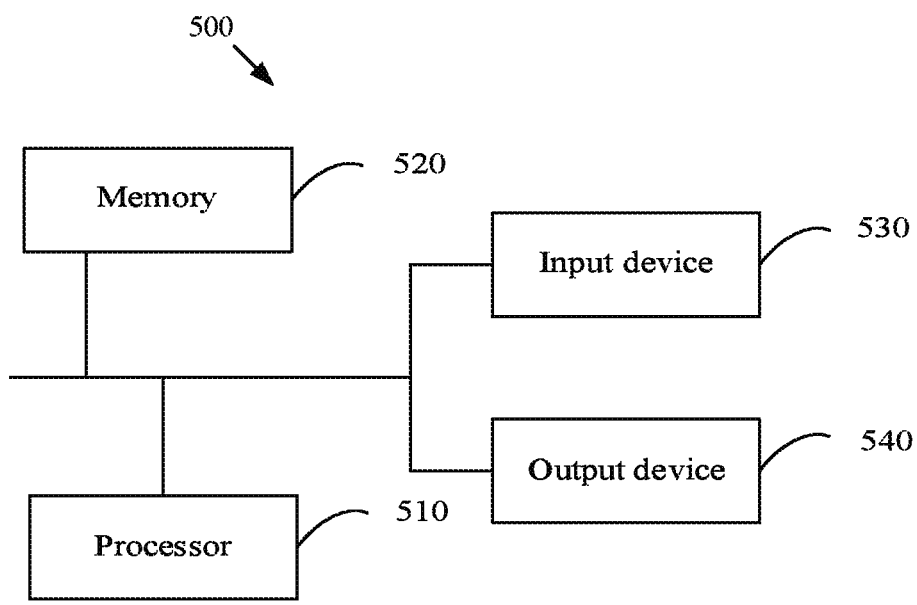
FIG. 5 is a schematic structural diagram of an electronic device according to an embodiment of this disclosure.

Based on the above embodiment, referring to FIG. 5, a schematic structural diagram of an electronic device according to an embodiment of this disclosure is shown.

This embodiment of this disclosure provides an electronic device 500. The electronic device 500 may include a center processing unit (CPU) 510, a memory 520, an input device 530, an output device 540, and the like. The input device 530 may include a keyboard, a mouse, a touch screen, and the like. The output device 540 may include a display device, such as a liquid crystal display (LCD) or a cathode ray tube (CRT).

The memory 520 may include a read-only memory (ROM) and a random access memory (RAM), and provide computer-readable instructions and data stored in the memory 520 for the processor 510. In the embodiment of this disclosure, the memory stores computer-readable instructions, and the computer-readable instructions, when executed by the processor, cause the processor to perform any method for matching a wireless hotspot and a point of interest according to the embodiments of this disclosure.

Based on the above embodiment, one or more non-transitory storage media storing computer-readable instructions are provided in an embodiment of the present disclosure, and the computer-readable instructions, when executed by one or more processors, cause the one or more processors to perform the method for matching a wireless hotspot and a point of interest in any above method embodiment.

A person skilled in the art can understand that the embodiments of this disclosure may be provided as a method, a system, or a computer-readable instruction product. Therefore, this disclosure may use a form of hardware-only embodiments, software-only embodiments, or embodiments combining software and hardware. In addition, this disclosure may use a form of a computer-readable instruction product that is implemented on one or more computer-readable storage media (including but not limited to a disk memory, a CD-ROM, an optical memory, and the like) that include computer-readable program code.

This disclosure is described with reference to flowcharts and/or block diagrams of the method, the device (system), and the computer-readable instruction product according to the embodiments of this disclosure. It is to be understood that computer-readable instructions can implement each procedure and/or block in the flowcharts and/or block diagrams and a combination of procedures and/or blocks in the flowcharts and/or block diagrams. These computer-readable instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer-readable instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer-readable instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

Although exemplary embodiments of this disclosure have been described, once persons skilled in the art know the basic creative concept, they can make additional changes and modifications to these embodiments. Therefore, the following claims are intended to be construed as to cover the exemplary embodiments and all changes and modifications falling within the scope of this disclosure.

Obviously, a person skilled in the art can make various modifications and variations to the embodiments of this disclosure without departing from the spirit and scope of the embodiments of this disclosure. In this way, if these modifications and variations made to the embodiments of this disclosure fall within the scope of the claims of this disclosure and equivalent technologies thereof, this disclosure also intends to include these changes and variations.

What is claimed is:

1. A method for matching a wireless hotspot and a point of interest, comprising:

acquiring, with a processor circuitry, a wireless hotspot name of a wireless hotspot and a point of interest name of a point of interest;

performing, with the processor circuitry, semantic normalization preprocessing on the wireless hotspot name and the point of interest name, respectively, to generate a preprocessed wireless hotspot name and a preprocessed point of interest name;

determining, with the processor circuitry, a first similarity between the preprocessed wireless hotspot name and the preprocessed point of interest name according to a matching result of consecutive common strings of the preprocessed wireless hotspot name and the preprocessed point of interest name, including:
  matching the preprocessed wireless hotspot name and the preprocessed point of interest name to determine a plurality of consecutive common strings, each of the plurality of consecutive common strings comprising at least two consecutive words or logographic characters present in both of the preprocessed wireless hotspot name and the preprocessed point of interest name; and
  determining lengths of the plurality of consecutive common strings and lengths of the preprocessed wireless hotspot name and the preprocessed point of interest name, each of the lengths of the plurality of consecutive common strings and lengths of the preprocessed wireless hotspot name and the preprocessed point of interest name comprising a number of words or logographic characters;
determining, with the processor circuitry and separate from determining the first similarity, a second similarity between the preprocessed wireless hotspot name and the preprocessed point of interest name according to a length difference between lengths of the preprocessed wireless hotspot name and the preprocessed point of interest name and without using a matching process used in determining the first similarity; and
determining, with the processor circuitry, a matching result of the wireless hotspot and the point of interest by calculating a weighted sum of the first similarity and the second similarity, wherein the weighted sum includes weighting the first similarity differently from the second similarity.

2. The method of claim 1, wherein the performing semantic normalization preprocessing on the wireless hotspot name and the point of interest name respectively comprises:
  deleting, based on a preset filter word library, filter words in the wireless hotspot name and the point of interest name respectively, wherein the preset filter word library comprises a plurality of filter words, and the filter words have general meaning without specific significance.

3. The method of claim 1, wherein the performing semantic normalization preprocessing on the wireless hotspot name and the point of interest name respectively comprises:
  replacing, based on a preset thesaurus, words having identical meaning in the wireless hotspot name and the point of interesting name with a corresponding general word.

4. The method of claim 1, wherein the determining the first similarity between the preprocessed wireless hotspot name and the preprocessed point of interest name comprises:
  determining similarity scores of the plurality of consecutive common strings according to the determined lengths of the plurality of consecutive common strings and determined lengths of the preprocessed wireless hotspot name and the preprocessed point of interest name; and
  determining, according to the similarity scores of the plurality of consecutive common strings, a first similarity between the preprocessed wireless hotspot name and the preprocessed point of interest name.

5. The method of claim 4, wherein the determining the similarity scores of the consecutive common strings according to lengths of the consecutive common strings and lengths of the preprocessed wireless hotspot name and the preprocessed point of interest name comprises:
  determining a minimum length value among the lengths of the preprocessed wireless hotspot name and the preprocessed point of interest name;
  determining ratios of the lengths of the consecutive common strings to the minimum value respectively; and
  determining, according to the ratios, the similarity scores of the corresponding consecutive common strings respectively.

6. The method of claim 4, wherein the determining a second similarity between the preprocessed wireless hotspot name and the preprocessed point of interest name comprises:
  determining a length difference between the lengths of the preprocessed wireless hotspot name and the preprocessed point of interest name; and
  determining, according to the length difference and the lengths of the preprocessed wireless hotspot name and the preprocessed point of interest name, a second similarity between the preprocessed wireless hotspot name and the preprocessed point of interest name.

7. The method of claim 6, wherein the determining the second similarity between the preprocessed wireless hotspot name and the preprocessed point of interest name comprises:
  determining a maximum length value among the lengths of the preprocessed wireless hotspot name and the preprocessed point of interest name;
  determining a ratio of the length difference to the maximum value;
  obtaining a difference by subtracting the ratio from 1; and
  determining the difference as the second similarity between the preprocessed wireless hotspot name and the preprocessed point of interest name.

8. The method of claim 1, wherein the determining the matching result of the wireless hotspot and the point of interest according to the first similarity or the second similarity comprises:
  determining, according to the first similarity and the second similarity, a third similarity between the preprocessed wireless hotspot name and the preprocessed point of interest name; and
  determining the matching result between the wireless hotspot and the point of interest according to the third similarity.

9. The method of claim 8, wherein the determining a third similarity between the preprocessed wireless hotspot name and the preprocessed point of interest name comprises:
  determining a first product of the first similarity and a first weight value and a second product of the second similarity and a second weight value, wherein a sum of the first weight value and the second weight value is 1; and
  determining a sum of the first product and the second product as the third similarity between the preprocessed wireless hotspot name and the preprocessed point of interest name.

10. The method of claim 8, wherein the determining the matching result of the wireless hotspot and the point of interest according to the first similarity or the second similarity comprises:
  in response to the first similarity being greater than or equal to a first preset threshold, determining that the wireless hotspot matches the point of interest; and
  in response to the first similarity being less than the first preset threshold, determining that the wireless hotspot fails to match the point of interest.

11. The method of claim 8, wherein the determining the matching result of the wireless hotspot and the point of interest according to the first similarity or the second similarity comprises:
in response to the second similarity being greater than or equal to a second preset threshold, determining that the wireless hotspot matches the point of interest; and
in response to the second similarity being less than the second preset threshold, determining that the wireless hotspot fails to match the point of interest.

12. The method of claim 8, wherein the determining the matching result of the wireless hotspot and the point of interest according to the first similarity or the second similarity comprises:
in response to the third similarity being greater than or equal to a third preset threshold, determining that the wireless hotspot matches the point of interest; and
in response to the third similarity being less than the third preset threshold, determining that the wireless hotspot fails to match the point of interest.

13. An apparatus for matching a wireless hotspot and a point of interest, comprising:
a memory operable to store computer-readable instructions; and
a processor circuitry operable to read the computer-readable instructions, the processor circuitry when executing the computer-readable instructions is configured to:
acquire a wireless hotspot name of a wireless hotspot and a point of interest name of a point of interest;
perform semantic normalization preprocessing on the wireless hotspot name and the point of interest name, respectively, to generate a preprocessed wireless hotspot name and a preprocessed point of interest name;
determine a first similarity between the preprocessed wireless hotspot name and the preprocessed point of interest name according to a matching result of consecutive common strings of the preprocessed wireless hotspot name and the preprocessed point of interest name, including
matching the preprocessed wireless hotspot name and the preprocessed point of interest name to determine a plurality of consecutive common strings, each of the plurality of consecutive common strings comprising at least two consecutive words or logographic characters present in both of the preprocessed wireless hotspot name and the preprocessed point of interest name; and
determining lengths of the plurality of consecutive common strings and lengths of the preprocessed wireless hotspot name and the preprocessed point of interest name, each of the lengths of the plurality of consecutive common strings and lengths of the preprocessed wireless hotspot name and the preprocessed point of interest name comprising a number of words or logographic characters;
determine, separate from determining the first similarity, a second similarity between the preprocessed wireless hotspot name and the preprocessed point of interest name according to a length difference between lengths of the preprocessed wireless hotspot name and the preprocessed point of interest name and without using a matching process used in determining the first similarity; and
determine a matching result of the wireless hotspot and the point of interest by calculating a weighted sum of the first similarity and the second similarity, wherein the weighted sum includes weighting the first similarity differently from the second similarity.

14. The apparatus of claim 13, wherein the processor circuitry is configured to:
delete, based on a preset filter word library, filter words in the wireless hotspot name and the point of interest name respectively, wherein the preset filter word library comprises a plurality of filter words, and the filter words have general meaning without specific significance.

15. The apparatus of claim 13, wherein the processor circuitry is configured to:
replace, based on a preset thesaurus, words having identical meaning in the wireless hotspot name and the point of interesting name with a corresponding general word.

16. The apparatus of claim 13, wherein the processor circuitry is configured to:
determine similarity scores of the plurality of consecutive common strings according to the lengths of the plurality of consecutive common strings and the lengths of the preprocessed wireless hotspot name and the preprocessed point of interest name; and
determine, according to the similarity scores of the plurality of consecutive common strings, a first similarity between the preprocessed wireless hotspot name and the preprocessed point of interest name.

17. The apparatus of claim 16, wherein the processor circuitry is configured to:
determine a length difference between the lengths of the preprocessed wireless hotspot name and the preprocessed point of interest name; and
determine, according to the length difference and the lengths of the preprocessed wireless hotspot name and the preprocessed point of interest name, a second similarity between the preprocessed wireless hotspot name and the preprocessed point of interest name.

18. The apparatus of claim 13, wherein the processor circuitry is configured to:
determine, according to the first similarity and the second similarity, a third similarity between the preprocessed wireless hotspot name and the preprocessed point of interest name, and
determine the matching result between the wireless hotspot and the point of interest according to the third similarity.

19. A non-transitory machine-readable media, having instructions stored on the machine readable media, the instructions configured to, when executed, cause a machine to:
acquire a wireless hotspot name of a wireless hotspot and a point of interest name of a point of interest;
perform semantic normalization preprocessing on the wireless hotspot name and the point of interest name, respectively, to generate a preprocessed wireless hotspot name and a preprocessed point of interest name;
determine a first similarity between the preprocessed wireless hotspot name and the preprocessed point of interest name according to a matching result of consecutive common strings of the preprocessed wireless hotspot name and the preprocessed point of interest name, including:
matching the preprocessed wireless hotspot name and the preprocessed point of interest name to determine a plurality of consecutive common strings, each of the plurality of consecutive common strings comprising at least two consecutive words or logographic characters present in both of the preprocessed wireless hotspot name and the preprocessed point of interest name; and determining lengths of the plurality of consecutive common strings and lengths of the preprocessed wireless hotspot name and the preprocessed point of interest name, each of the lengths of the plurality of consecutive common strings and lengths of the preprocessed wireless hotspot name and the preprocessed point of interest name comprising a number of words or logographic characters;

determine, separate from determining the first similarity, a second similarity between the preprocessed wireless hotspot name and the preprocessed point of interest name according to a length difference between lengths of the preprocessed wireless hotspot name and the preprocessed point of interest name and without using a matching process used in determining the first similarity; and determine a matching result of the wireless hotspot and the point of interest by calculating a weighted sum of the first similarity and the second similarity, wherein the weighted sum includes weighting the first similarity differently from the second similarity.

20. The non-transitory machine-readable media of claim 19, wherein the instructions are configured to cause the machine to:

delete, based on a preset filter word library, filter words in the wireless hotspot name and the point of interest name respectively, wherein the preset filter word library comprises a plurality of filter words, and the filter words have general meaning without specific significance; and replace, based on a preset thesaurus, words having identical meaning in the wireless hotspot name and the point of interesting name with a corresponding general word.

* * * * *